May 19, 1953  H. G. MENSSEN  2,638,950
FOOD SLICING MACHINE
Filed May 31, 1949  2 Sheets-Sheet 1
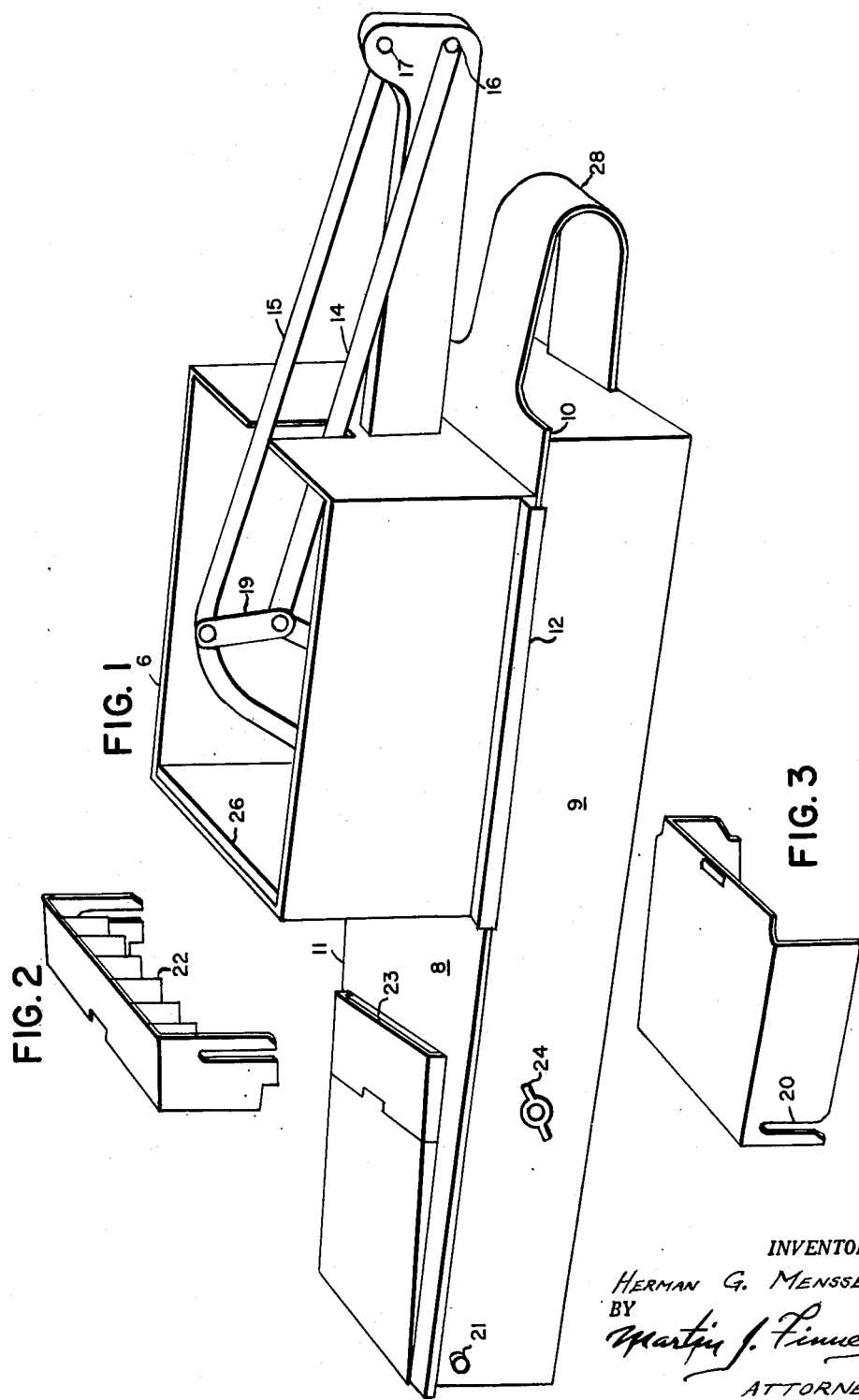
INVENTOR.
HERMAN G. MENSSEN
BY Martin J. Finnegan
ATTORNEY

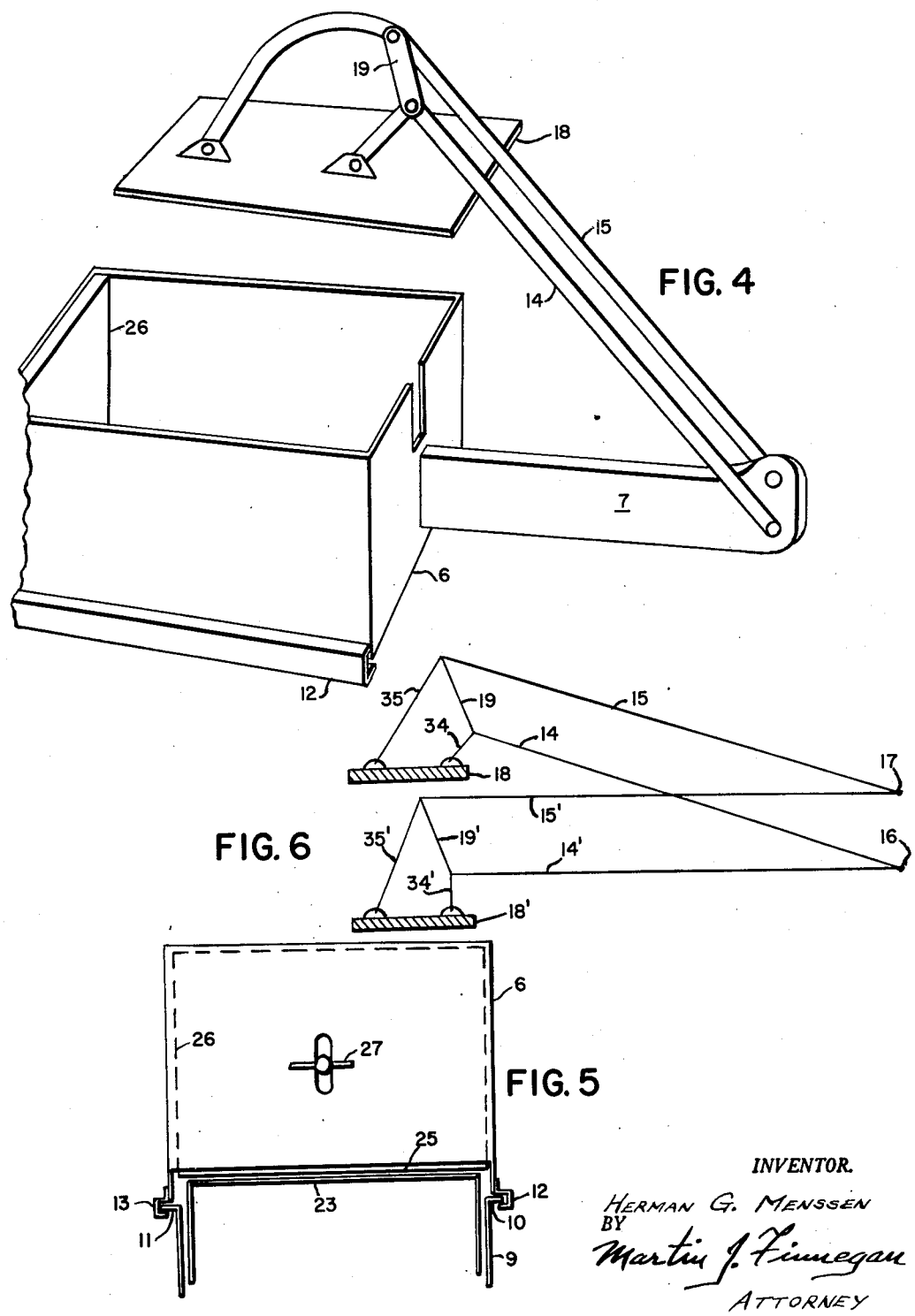

Patented May 19, 1953

2,638,950

UNITED STATES PATENT OFFICE 2,638,950

FOOD SLICING MACHINE

Herman G. Menssen, West Norwood, N. J.

Application May 31, 1949, Serial No. 96,314

1 Claim. (Cl. 146—168)

This invention relates to slicing machines, and particularly to a machine for slicing, sectioning, or shredding various kinds of foods.

An object of the invention is to provide a machine having a cutting tool with one or more stationary blades or cutting edges disposed in the path of travel of a manually reciprocable carriage containing the food to be sliced, sectioned, or shredded; the novel arrangement being such that it is impossible for the operator to cut himself as the machine is being operated.

A second object is to provide, in a machine of the character indicated, novel means facilitating the removal of one cutting tool and the substitution of another cutting tool of different capabilities, according to the nature of the cutting operation desired as, for example, the removal of a single-edged slicing tool and the substitution of a multiple-edged sectioning or shredding tool.

A third object is to provide, in a machine of the character indicated, novel means for exerting pressure on the food as the carriage is reciprocated, such novel pressure-exerting means operating to feed the food uniformly to the cutting tool, and thereby insure a uniformly divided product.

A fourth object is to provide, in a pressure-exerting means of the character indicated, a novel arrangement of operating linkage serving to maintain a substantially constant, vertically directed pressure on the food, in response to a simple manual operation performed subconsciously by the operator, as he moves the carriage along its prescribed path of travel.

These objects of the invention will be understood upon reference to the following description of the invention as illustrated in the accompanying drawings wherein:

Figure 1 is a perspective view of the complete machine;

Figure 2 is a view of a multiple-bladed cutting tool adapted for use in the machine of Figure 1;

Figure 3 is a view of the tool holder;

Figure 4 is a view of the machine as it appears when the pressure-plate is raised to allow food to be inserted in the carriage;

Figure 5 is an end view of the machine and Figure 6 is a schematic diagram showing how true vertical motion of the carriage cover is achieved.

The machine includes, as one of its major elements, a rectangular carriage 6 equipped with a handle 7 by which the carriage may be manually reciprocated along the surface 8 of a second rectangular structure 9 serving as a base or table supporting the carriage 6; the upper surface 8 of the table 9 having overhanging edges 10 and 11 to serve as tracks or rails for engagement by runners 12 and 13 (see particularly Fig. 5) that are provided at the base of the carriage 6, by which runners the carriage reciprocation along the tracks 10 and 11 is facilitated.

In addition to the handle 7, the carriage is provided with a novel linkage including a pair of handle arms 14 and 15 pivotally connected to the handle 7, as indicated at 16 and 17 respectively, and also pivotally connecting with a cover plate 18 adapted to be pressed downwardly in a vertical direction in the carriage 6 for the purpose of exerting pressure upon the articles of food previously placed in the carriage; the cover plate 18 being movable to an upper position as indicated in Fig. 4 to permit such articles of food to be placed in the carriage. In order to convert the pivoting movement of the links 14 and 15 into a substantially true, vertical, rectilineal of the cover plate 18, and thereby maintain a substantially uniform pressure upon the food as the carriage is reciprocated, the links 14 and 15 are supplemented by the provision of a pair of links 34, 35 and a transverse link 19 having pivoted connection with both links 14 and 15 in such manner as to permit relative swing of said links and thereby permit the cover plate 18 to slide easily along the vertical sides of the carriage between the upper and lower extreme positions, as indicated schematically in Figure 6, wherein the lower positions of the parts are designated by adding prime suffixes to the respective numerals.

The novel arrangement of the cutting mechanism, in relation to the reciprocating carriage 6, involves the provision of two cooperating elements, namely, a cutting tool such as illustrated in Fig. 2, and a tool holder as illustrated in Fig. 3, the latter having slots 20 near its rear edge to fit over a transverse rod or pin 21 to secure it in position within the cable structure 9, and the cutting tool 22 having a projection adapted to be received in a slot in the tool holder in such a manner as to allow the tool to be inclined upwardly above the surface 8 of the table, as indicated at 23 in Fig. 1; the extent of projection above the table surface being adjustable by the means indicated at 24, so that the cutting tool will be at the same level as the bottom edge 25 of the adjustable barrier plate 26. This barrier plate 26 is slideable along the rear vertical wall of the carriage 6, and is adjusted at the desired height by the adjusting means 27 indicated in Fig. 5.

In operation, the user first places the food to be sliced, sectioned or shredded in the carriage 6 and then lowers the cover plate 18 to exert pressure on the food. With the left hand, the operator steadies the table 9, the latter being provided with a handle 28 for this purpose. With the right hand (or vice versa) the operator grasps the carriage handle 7 and in the same grip exerts a squeezing pressure on the links 14 and 15, and then proceeds to push the carriage along the rails 10 and 11 until it passes over and beyond the projecting forward edge of the cutting tool 23, which tool then performs the slicing or other cutting action as the carriage proceeds; the amount of opening below the lower edge 25 of the barrier 26 being just sufficient to enable the carriage to proceed over the tool. In this way a section of the food is severed from the remainder of the food; and as this cutting occurs along the lower portion of the food, and with the cutting blade or blades completely protected by the walls of the carriage, there is no possibility of placing any part of the hand against said blade or blades, hence it is impossible for the operator to cut himself while performing the slicing or other sectioning operation.

After the operator has pushed the carriage to the end of its path, thus completing the cutting operation in the manner above described, he may (without removing his grasp upon the handle 7 and links 14 and 15) draw the carriage back to the starting point, and then repeat the operation a sufficient number of times to accomplish the complete slicing or sectioning of whatever food articles have been placed in the carriage.

What I claim is:

In a food slicing machine, a food receiving box, a pressure feed plate movable vertically within the box, the side edges of said pressure feed plate having a running clearance with the inner side walls of the food box, a plane surfaced table slidably supporting said box, guides on the edges of the table cooperating with guides on the lower side edges of the box, a shearing element fixed to the table and projecting upwardly from the table, a member attached to said box and extending rearwardly thereof and forming a handle support, two handle arms pivotally attached at vertically spaced pivots on the outer end of the handle support, a link of a length to maintain the arms parallel connecting pivotally the free ends of the arms, the pressure feed plate having a pair of longitudinally spaced pivots on its upper surface and a pair of links each pivotally connecting one of the pivots on the pressure plate with a pivot on one of the free ends of the arms.

HERMAN G. MENSSEN.

References Cited in the file of this patent

UNITED STATES PATENTS

| Number | Name | Date |
|--------|------|------|
| 1,296,091 | Kriebel | Mar. 4, 1919 |
| 2,286,177 | Fabian | June 9, 1942 |

FOREIGN PATENTS

| Number | Country | Date |
|--------|---------|------|
| 402,374 | France | Oct. 6, 1909 |